United States Patent
Goncalves

(10) Patent No.: US 9,396,404 B2
(45) Date of Patent: Jul. 19, 2016

(54) ROBUST INDUSTRIAL OPTICAL CHARACTER RECOGNITION

(71) Applicant: Datalogic ADC, Inc., Eugene, OR (US)

(72) Inventor: Luis Goncalves, Pasadena, CA (US)

(73) Assignee: DATALOGIC ADC, INC., Eugene, OR (US)

( * ) Notice: Subject to any disclaimer, the term of this patent is extended or adjusted under 35 U.S.C. 154(b) by 0 days.

(21) Appl. No.: 14/450,394

(22) Filed: Aug. 4, 2014

(65) Prior Publication Data

US 2016/0034773 A1 Feb. 4, 2016

(51) Int. Cl.
*G06K 9/00* (2006.01)
*G06K 9/18* (2006.01)
*G06K 9/46* (2006.01)

(52) U.S. Cl.
CPC ............... *G06K 9/18* (2013.01); *G06K 9/4609* (2013.01); *G06K 9/4642* (2013.01); *G06K 9/4652* (2013.01)

(58) Field of Classification Search
CPC combination set(s) only.
See application file for complete search history.

(56) References Cited

U.S. PATENT DOCUMENTS

| | | |
|---|---|---|
| 5,497,314 A | 3/1996 | Novak |
| 5,513,277 A | 4/1996 | Huttenlocher |
| 5,513,304 A | 4/1996 | Spitz et al. |
| 5,745,600 A | 4/1998 | Chen et al. |
| 6,050,731 A | 4/2000 | Matsui |
| 6,249,604 B1 | 6/2001 | Huttenlocher et al. |
| 6,711,293 B1 | 3/2004 | Lowe |
| 7,031,525 B2 | 4/2006 | Beardsley |
| 7,118,026 B2 | 10/2006 | Harris et al. |
| 7,422,147 B2 | 9/2008 | Rosenbaum |
| 7,519,201 B2 | 4/2009 | Yang et al. |
| 7,599,543 B2 | 10/2009 | Jones et al. |
| 7,602,956 B2 | 10/2009 | Jones et al. |
| 8,033,470 B2 | 10/2011 | Maeda et al. |
| 8,196,822 B2 | 6/2012 | Goncalves |
| 8,224,110 B2 * | 7/2012 | Mishima ............ G06K 9/4647 382/168 |
| 8,306,318 B2 | 11/2012 | Cao et al. |

(Continued)

FOREIGN PATENT DOCUMENTS

| | | |
|---|---|---|
| JP | 3-238573 A | 10/1991 |
| JP | 2013-21519 A | 1/2013 |

(Continued)

OTHER PUBLICATIONS

"Histogram of oriented gradients," Wikipedia, the free encyclopedia, retrieved on Jun. 5, 2014, from http://en.wikipedia.org/wiki/Histogram_of_oriented_gradients, 7 pages.

(Continued)

*Primary Examiner* — Anand Bhatnagar
(74) *Attorney, Agent, or Firm* — Seed IP Law Group PLLC

(57) ABSTRACT

Systems, methods, and articles to provide robust optical character recognition (OCR) for use in industrial environments. One or more implementations include utilizing Histogram of Oriented Gradients (HOG) features with a sliding window approach as a robust and computationally efficient method of OCR. The implementations are relatively simple to use because there are relatively few parameters to adjust, which allows a non-expert user to setup or modify the system and achieve desirable performance. One reason this is possible is because the implementations described herein do not require character segmentation, which can be difficult to optimize.

38 Claims, 12 Drawing Sheets

(56) References Cited

U.S. PATENT DOCUMENTS

| | | | |
|---|---|---|---|
| 8,353,457 B2 | 1/2013 | Olmstead | |
| 8,396,278 B2 | 3/2013 | Jones et al. | |
| 8,489,232 B2 | 7/2013 | Mishra et al. | |
| 8,509,534 B2 | 8/2013 | Galic et al. | |
| 8,509,537 B2 * | 8/2013 | Perronnin | G06K 9/00879 382/156 |
| 8,538,081 B2 | 9/2013 | Ding et al. | |
| 8,542,926 B2 | 9/2013 | Panjwani et al. | |
| 8,774,510 B2 * | 7/2014 | Xu | G06K 9/3275 382/170 |
| 8,902,760 B2 | 12/2014 | Austermann, III et al. | |
| 8,942,420 B2 * | 1/2015 | Kim | G06K 9/72 382/103 |
| 9,111,173 B2 * | 8/2015 | Ranganathan | G06K 9/4676 |
| 9,239,943 B2 | 1/2016 | Svetal | |
| 2004/0143504 A1 | 7/2004 | Tsai | |
| 2007/0061226 A1 | 3/2007 | Ajiki et al. | |
| 2007/0120736 A1 | 5/2007 | MacKenzie et al. | |
| 2008/0087727 A1 | 4/2008 | Jenney et al. | |
| 2009/0084854 A1 | 4/2009 | Carlson et al. | |
| 2009/0198371 A1 | 8/2009 | Emanuel et al. | |
| 2011/0106653 A1 | 5/2011 | Wein | |
| 2011/0286628 A1 | 11/2011 | Goncalves et al. | |
| 2012/0033874 A1 * | 2/2012 | Perronnin | G06K 9/00879 382/159 |
| 2012/0153662 A1 | 6/2012 | MacNeil et al. | |
| 2012/0187191 A1 | 7/2012 | Olmstead | |
| 2013/0001295 A1 | 1/2013 | Goncalves | |
| 2013/0020391 A1 | 1/2013 | Olmstead et al. | |
| 2013/0077873 A1 | 3/2013 | Bar Hillel et al. | |
| 2013/0259310 A1 * | 10/2013 | Tsukamoto | G06K 9/00362 382/103 |
| 2013/0315437 A1 | 11/2013 | Kerschner et al. | |
| 2014/0029857 A1 | 1/2014 | Kompalli et al. | |
| 2014/0072217 A1 * | 3/2014 | Xu | G06K 9/3275 382/170 |
| 2014/0112526 A1 * | 4/2014 | Kim | G06K 9/72 382/103 |
| 2014/0355835 A1 | 12/2014 | Rodriguez-Serrano et al. | |
| 2015/0347801 A1 | 12/2015 | Svetal | |

FOREIGN PATENT DOCUMENTS

| | | |
|---|---|---|
| JP | 2014-029608 A | 2/2014 |
| WO | 2012/103139 A2 | 8/2012 |
| WO | 2013/090023 A2 | 6/2013 |
| WO | 2013/150604 A1 | 10/2013 |

OTHER PUBLICATIONS

Dalal et al., "Histograms of Oriented Gradients for Human Detection," IEEE Computer Society Conference on Computer Vision and Pattern Recognition, San Diego, CA, Jun. 25, 2005, 8 pages.

Dollár et al., "Crosstalk Cascades for Frame-Rate Pedestrian Detection," European Conference on Computer Vision, Sep. 2012, 14 pages.

Dollár et al., "Fast Feature Pyramids for Object Detection," Submission to IEEE Transactions on Pattern Analysis and Machine Intelligence, 2014, 14 pages.

Dollár et al., "The Fastest Pedestrian Detector in the West," Proceedings of the British Machine Vision Conference, BMVA Press, Sep. 2010, 11 pages.

Dollár et al., "Integral Channel Features," British Machine Vision Conference, London, England, 2009, 11 pages.

Lowe, "Object Recognition from Local Scale-Invariant Features," Proceedings of the International Conference on Computer Vision, Sep. 1999, 8 pages.

Minetto et al., "SnooperText: A text detection system for automatic indexing of urban scenes," *Computer Vision and Image Understanding*, 2013, 13 pages.

Minetto et al., "T-HOG: an Effective Gradient-Based Descriptor for Single Line Text Regions," Preprint submitted to Pattern Recognition, Nov. 1, 2012, 36 pages.

Munich et al., "SIFT-ing Through Features with ViPR," IEEE Robotics & Automation Magazine, Sep. 2006, pp. 72-77.

Ott, "Segmentation Features, Visibility Modeling and Shared Parts for Object Detection," PhD thesis, The University of Leeds School of Computing, Feb. 2012, 215 pages.

Ott et al., "Implicit Color Segmentation Features for Pedestrian and Object Detection," IEEE 12th International Conference on Computer Vision, Kyoto, Japan, Sep. 29-Oct. 2, 2009, 8 pages.

Prates et al., "Brazilian License Plate Detection Using Histogram of Oriented Gradients and Sliding Windows," *International Journal of Computer Science & Information Technology* 5(6):39-52, Dec. 2013.

Wang et al., "Word Spotting in the Wild," Proceedings of the 11th European Conference on Computer Vision: Part 1, Springer-Verlag Berlin, 2010, pp. 591-604.

Deppieri et al., "Optical Character Recognition Localization Tool," U.S. Appl. No. 14/815,741, filed Jul. 31, 2015, 38 pages.

Svetal, "Object Recognition for Exception Handling in Automatic Machine-Readable Symbol Reader Systems," U.S. Appl. No. 14/289,950, filed May 29, 2014, 58 pages.

Svetal, "Object Recognition for Exception Handling in Automatic Machine-Readable Symbol Reader Systems," Office Action mailed Apr. 27, 2015, for U.S. Appl. No. 14/289,950, 32 pages.

Razak et al., "Off-line Handwriting Text Line Segmentation: A Review," *IJCSNS International Journal of Computer Science and Network Security* 8(7): 12-20, 2008.

Svetal, "Object Recognition for Exception Handling in Automatic Machine-Readable Symbol Reader Systems," Amendment, filed Aug. 24, 2015, for U.S. Appl. No. 14/289,950, 14 pages.

Svetal, "Object Recognition for Exception Handling in Automatic Machine-Readable Symbol Reader Systems," Notice of Allowance, mailed Sep. 11, 2015, for U.S. Appl. No. 14/289,950, 8 pages.

Dalal et al., "Histograms of Oriented Gradients for Human Detection," *Proceedings of the 2005 IEEE Computer Society Conference on Computer Vision and Pattern Recognition (CVPR'05)*, 2005, 8 pages.

Li, "Vehicle License Plate Detection and Recognition," *A Thesis presented to the Faculty of the Graduate School at the University of Missouri in Partial Fulfillment of the Requirements for the Degree of Master of Science*, Dec. 2010, 69 pages.

Newell et al., "Multiscale Histogram of Oriented Gradient Descriptors for Robust Character Recognition," *2011 International Conference on Document Analysis and Recognition*, Beijing, China, Sep. 18-21, 2011, pp. 1085-1089. (5 pages).

Partial European Search Report, dated Apr. 12, 2016, for corresponding European Application No. 15179660.4-1901/2983112, 10 pages.

US 8,348,169, 01/2013, Wang et al. (withdrawn)

\* cited by examiner

COLUMN

|  | | N-2 | N-1 | N | N+1 | N+2 |
|---|---|---|---|---|---|---|
|  | M-2 | 2-P | 2-P | 2-P | 2-P | 2-P |
|  | M-1 | 2-P | 1-P | 1-P | 1-P | 2-P |
| ROW | M | 2-P | 1-P | CP | 1-P | 2-P |
|  | M+1 | 2-P | 1-P | 1-P | 1-P | 2-P |
|  | M+2 | 2-P | 2-P | 2-P | 2-P | 2-P |

FIG.12

ROBUST INDUSTRIAL OPTICAL CHARACTER RECOGNITION

BACKGROUND

1. Technical Field

The present disclosure generally relates to computer vision, and in particular relates to optical character recognition in industrial environments.

2. Description of the Related Art

Optical character recognition (OCR) is the mechanical or electronic conversion of scanned or photographed images of alphanumeric or other characters into machine-encoded/computer-readable alphanumeric or other characters. OCR is used as a form of data entry from some sort of original data source, such as product packaging (e.g., a bag of chips, a box, etc.), books, receipts, business cards, mail, or any other object having characters printed or inscribed thereon. OCR is a common method of digitizing printed characters so that the characters can be electronically identified, edited, searched, stored more compactly, displayed on-line, or used in machine processes such as machine translation, text-to-speech, verification, key data extraction and text mining.

Typically, the OCR process can be viewed as a combination of two main sub-processes: (1) segmentation and (2) recognition or classification. The segmentation sub-process locates and "isolates" the individual characters. The recognition or classification sub-process classifies the characters in question and assigns to each character a corresponding alphanumerical or other character or symbol. The OCR process is typically divided into two sub-processes because the classification sub-process is computationally expensive, and therefore it is advantageous that the classification sub-process not be done throughout an entire image, but rather only at select locations where the segmentation sub-process has detected a potential character. For high quality images, characters are well separated and segmentation sub-process becomes relatively straightforward. However, often images suffer from low contrast, high degree of noise, character variation, character skew, background variation, or other non-ideal factors. These factors complicate the segmentation sub-process, and segmentation errors lead to the failure in the recognition sub-process.

OCR is frequently used in many computer vision systems to detect text associated with various manufacturing processes. For example, OCR may be used to verify that a label has been correctly printed on a packaging for a product. In a specific implementation, OCR may be used to verify the presence of a "best before date" label on a product's packaging. The best before date is a piece of information written on the package of perishable foods that identifies the date past which a product is no longer suitable for consumption. Typically, inkjet printers are used to write the best before date on the otherwise pre-printed packages since inkjet printers represent a mature and reliable technology, are capable of printing at high speeds, and are relatively low cost. Nevertheless, occasionally errors may occur in the printing process (e.g., low contrast, missing characters), which compels verification that the labels are printed correctly.

Setting up OCR parameters for a given application can be very difficult, especially for an inexperienced user. Unlike many applications, which can be solved in advance by a system integrator, present OCR systems can require technicians or engineers to be present on the production floor to train or modify the runtime parameters, which causes a significant expenditure of time and expense. Further, the OCR parameters of a system may need to be adjusted when new parts or products are introduced, or when new printing systems or labels are used. For existing systems, if the default OCR segmentation parameters do not allow the OCR system to perform at a suitable level, the user may be confronted with a list of tens of parameters (e.g., 20-30 parameters) that might require adjustment. Adjusting these parameters may require significant training and/or experience.

BRIEF SUMMARY

A method of operation in an image processor system for recognizing one or more characters in an image of a target object may be summarized as including receiving, by a processor, image data representing an image of the target object; generating histogram of oriented gradients (HOG) features for the received image data; accessing, by the processor, a plurality of HOG character models stored in a nontransitory processor-readable storage medium, each of the plurality of HOG character models associated with a respective known character; for each of a plurality of image locations of the image, comparing each of the plurality of HOG character models to the generated HOG features of the image at the image location; and logically associating in a nontransitory processor-readable storage medium at least one known character with at least one image location based on the comparison to generate at least one candidate character location. Each of the plurality of HOG character models may include a plurality of bins each having a spatial dimension, and generating histogram of oriented gradients (HOG) features for the received image data may include dividing the received image data into a plurality of bins each having a spatial dimension that is equal to the spatial dimension of the bins associated with the HOG character models. Dividing the received image data into a plurality of bins may include dividing the received image data into a plurality of bins each having a width of six pixels, seven pixels, or eight pixels, and a height of six pixels, seven pixels, or eight pixels. Comparing each of the plurality of HOG character models to the generated HOG features of the image at the image location may include, for each of a plurality of image locations of the image, correlating each of the plurality of HOG character models with the HOG features at the image location to generate a correlation value for each of the HOG character models.

The method may further include, for each of the plurality of image locations, selecting one of the plurality of HOG character models having the highest correlation value with the image location; logically associating the highest correlation value of the selected HOG character model with the image location in a nontransitory processor-readable storage medium; and logically associating the known character associated with the selected HOG character model with the image location in a nontransitory processor-readable storage medium.

The method may further include, for each of the plurality of image locations, comparing the highest correlation value of the selected HOG character model at the image location to the highest correlation value for at least one neighboring image location.

The method may further include, for each of the plurality of image locations, comparing the highest correlation value of the selected HOG character model at the image location to the highest correlation value for each image location that is a 1-pixel neighbor of the image location.

The method may further include, for each of the plurality of image locations, selecting the image location as a candidate character location if the highest correlation value of the selected HOG character model at the image location is equal to or greater than the highest correlation value for each image location that is a 1-pixel neighbor of the image location.

The method may further include, for each of the image locations selected as a candidate character location, comparing the highest correlation value of the selected HOG character model at the image location to at least one correlation value for each image location that is a 2-pixel neighbor of the image location.

The method may further include, for each of the image locations selected as a candidate character location, comparing the highest correlation value of the selected HOG character model at the image location with at least one of: a mean of the correlation values of the selected HOG character model at the image locations that are 2-pixel neighbors of the image location, a median of the correlation values of the selected HOG character model at the image locations that are 2-pixel neighbors of the image location, or a maximum of the correlation values of the selected HOG character model at the image locations that are 2-pixel neighbors of the image location.

The method may further include, for each of the image locations selected as a candidate character location, retaining the image location as a candidate character location if the highest correlation value of the selected HOG character model at the image location is greater than or equal to twice at least one of: the mean of the correlation values of the selected HOG character model at the image locations that are 2-pixel neighbors of the image location, the median of the correlation values of the selected HOG character model at the image locations that are 2-pixel neighbors of the image location, or the maximum of the correlation values of the selected HOG character model at the image locations that are 2-pixel neighbors of the image location.

The method may further include combining two or more candidate character locations to form at least one word including two or more of the known characters; and storing the at least one word in a nontransitory processor-readable storage medium. Combining two or more candidate character locations to form at least one word including two or more of the known characters may include evaluating two or more candidate character locations for at least one of character spacing or character orientation.

The method may further include evaluating a spatial distance between two candidate character locations; and determining that the at least one word represents at least two words based at least in part on evaluating the spatial distance.

The method may further include forming at least two words each including two or more of the known characters; evaluating a spatial distance between the at least two words; determining that the at least two words represent a single word based at least in part on evaluating the spatial distance; and combining the two words to form the single word.

The method may further include detecting at least one character spaced between two of the at least two formed words.

The method may further include determining a quality measure based at least in part on the comparing of each of the plurality of HOG character models to the generated HOG features of the image.

The method may further include dividing the image data into a first portion in which characters are found and a second portion in which no characters are found, wherein generating histogram of oriented gradients (HOG) features for the received image data comprises generating histogram of oriented gradients (HOG) features for only the first portion of the received image data.

The method may further include determining that at least one portion of the image data is of uniform color, wherein generating histogram of oriented gradients (HOG) features for the received image data comprises discarding the at least one portion determined to be of uniform color. Logically associating in a nontransitory processor-readable storage medium at least one known character with at least one image location based on the comparison to generate at least one candidate character location may include logically associating in a nontransitory processor-readable storage medium two or more known characters with one image location based on the comparison to generate at least one candidate character location associated with the two or more known characters.

An image processor system may be summarized as including at least one processor; and at least one nontransitory processor-readable medium, communicatively coupled to the at least one processor and which stores histogram of oriented gradient (HOG) character models of a set of known characters and at least one of processor-executable instructions or data, wherein in use the at least one processor: receives image data that represents an image of a target object; generates histogram of oriented gradients (HOG) features for the received image data; accesses the plurality of HOG character models stored in the at least one nontransitory processor-readable storage medium, each of the plurality of HOG character models associated with a respective known character; for each of a plurality of image locations of the image, compares each of the plurality of HOG character models to the generated HOG features of the image at the image location; and logically associates in the at least one nontransitory processor-readable storage medium at least one known character with at least one image location based on the comparison to generate at least one candidate character location. Each of the plurality of HOG character models may include a plurality of bins each having a spatial dimension, and the at least one processor may divide the received image data into a plurality of bins each having a spatial dimension that is equal to the spatial dimension of the bins associated with the HOG character models. The at least one processor may divide the received image data into a plurality of bins each having a width of six pixels, seven pixels, or eight pixels, and a height of six pixels, seven pixels, or eight pixels. For each of a plurality of image locations of the image, the at least one processor may correlate each of the plurality of HOG character models with the HOG features at the image location to generate a correlation value for each of the HOG character models.

For each of a plurality of image locations of the image, the at least one processor may select one of the plurality of HOG character models having the highest correlation value with the image location; logically associate the highest correlation value of the selected HOG character model with the image location in a nontransitory processor-readable storage medium; and logically associate the known character associated with the selected HOG character model with the image location in a nontransitory processor-readable storage medium.

For each of a plurality of image locations of the image, the at least one processor may compare the highest correlation value of the selected HOG character model at the image location to at least one correlation value for at least one neighboring image location.

The at least one processor may compare the highest correlation value of the selected HOG character model at the image location to at least one correlation value for each image location that is a 1-pixel neighbor of the image location; and select the image location as a candidate character location if the highest correlation value of the selected HOG character model at the image location is equal to or greater than the at least one correlation value for each image location that is a 1-pixel neighbor of the image location. The at least one processor may compare the highest correlation value of the selected HOG character model at the image location to at least one correlation value for each image location that is a 2-pixel neighbor of the image location. The at least one processor may combine two or more candidate character locations to form at least one word that includes two or more of the known characters; and store the at least one word in the at least one nontransitory processor-readable storage medium. The at least one processor may evaluate two or more candidate character locations for at least one of character spacing or character orientation. The at least one processor may evaluate a spatial distance between two candidate character locations; and determine the at least one word represents at least two words based at least in part on evaluation of the spatial distance. The at least one processor may form at least two words each including two or more of the known characters; evaluate a spatial distance between the at least two words; determine the at least two words represent a single word based at least in part on evaluation of the spatial distance; and combine the two words to form the single word. The at least one processor may detect at least one character spaced between two of the at least two formed words. The at least one processor may determine a quality measure based at least in part on the comparison of each of the plurality of HOG character models to the generated HOG features of the image. The at least one processor may divide the image data into a first portion in which characters are found and a second portion in which no characters are found; and generate histogram of oriented gradients (HOG) features for only the first portion of the received image data. The at least one processor may determine that at least one portion of the image data is of uniform color; and generate histogram of oriented gradients (HOG) features for the received image data, wherein the at least one processor discards the at least one portion determined to be of uniform color.

A method of operation in an image processor system for recognizing one or more words in an image of a target object may be summarized as including receiving, by at least one processor, training image data representing a plurality of training characters; generating a plurality of histogram of oriented gradients (HOG) character models, each of the plurality of HOG character models associated with one of the training characters; receiving, by at least one processor, image data representing an image of the target object; generating HOG features for the received image data; determining correlations between each of the HOG character models and the HOG features for the received image data; determining a plurality of candidate character locations based on the determined correlations; and assembling at least one word using at least some of the determined plurality of candidate character locations.

Determining a plurality of candidate character locations based on the determined correlations may include, for each image location of a plurality of image locations, determining a maximum correlation value at the image location, the maximum correlation value being a correlation value of one or more of the plurality of HOG character models having the highest correlation value with the HOG features at the image location; determining whether the image location is a local peak by determining whether the maximum correlation value at the image location is greater than or equal to maximum correlation values at image locations that are 1-pixel neighbors of the image location; selecting the image location as a prospective candidate character location upon determining that the image location is a local peak; for each image location selected as a prospective candidate character location, determining whether the image location is a strong local peak by comparing the maximum correlation value at the image location with correlation values between the HOG character model and the HOG features at image locations that are 2-pixel neighbors of the image location; and selecting the image location as a candidate character location upon determining that the image location is a strong local peak.

Determining whether the image location is a strong local peak by comparing the maximum correlation value at the image location with correlation values between the HOG character model and the HOG features at image locations that are 2-pixel neighbors of the image location may include comparing the maximum correlation value at the image location with at least one of: a mean of the correlation values between the HOG character model and the HOG features at image locations that are 2-pixel neighbors of the image location; a median of the correlation values between the HOG character model and the HOG features at image locations that are 2-pixel neighbors of the image location; or a maximum of the correlation values between the HOG character model and the HOG features at image locations that are 2-pixel neighbors of the image location.

Determining a plurality of candidate character locations based on the determined correlations may include, for each image location of a plurality of image locations, for each HOG character model of the generated plurality of HOG character models, determining whether the image location is a local peak by determining whether the correlation value between the HOG character model and the HOG features at the image location is greater than or equal to the correlation values between the HOG character model and the HOG features at image locations that are 1-pixel neighbors of the image location; selecting the image location as a prospective candidate character location upon determining that the image location is a local peak; for each image location selected as a prospective candidate character location, determining whether the image location is a strong local peak by comparing the correlation value between the HOG character model and the HOG features at the at the image location with correlation values between the HOG character model and the HOG features at image locations that are 2-pixel neighbors of the image location; and selecting the image location as a candidate character location upon determining that the image location is a strong local peak.

Determining a plurality of candidate character locations based on the determined correlations may include for each image location of a plurality of image locations, for each HOG character model of the generated HOG character models, determining whether the image location is a strong local peak by comparing the correlation value between the HOG character model and the HOG features at the at the image location with correlation values between the HOG character model and the HOG features at image locations that are 2-pixel neighbors of the image location; and selecting the image location as a candidate character location upon determining that the image location is a strong local peak.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 12 is a diagram illustrating 1-pixel neighbors and 2-pixel neighbors of a center pixel, according to at least one illustrated embodiment.

DETAILED DESCRIPTION

Figure 1:
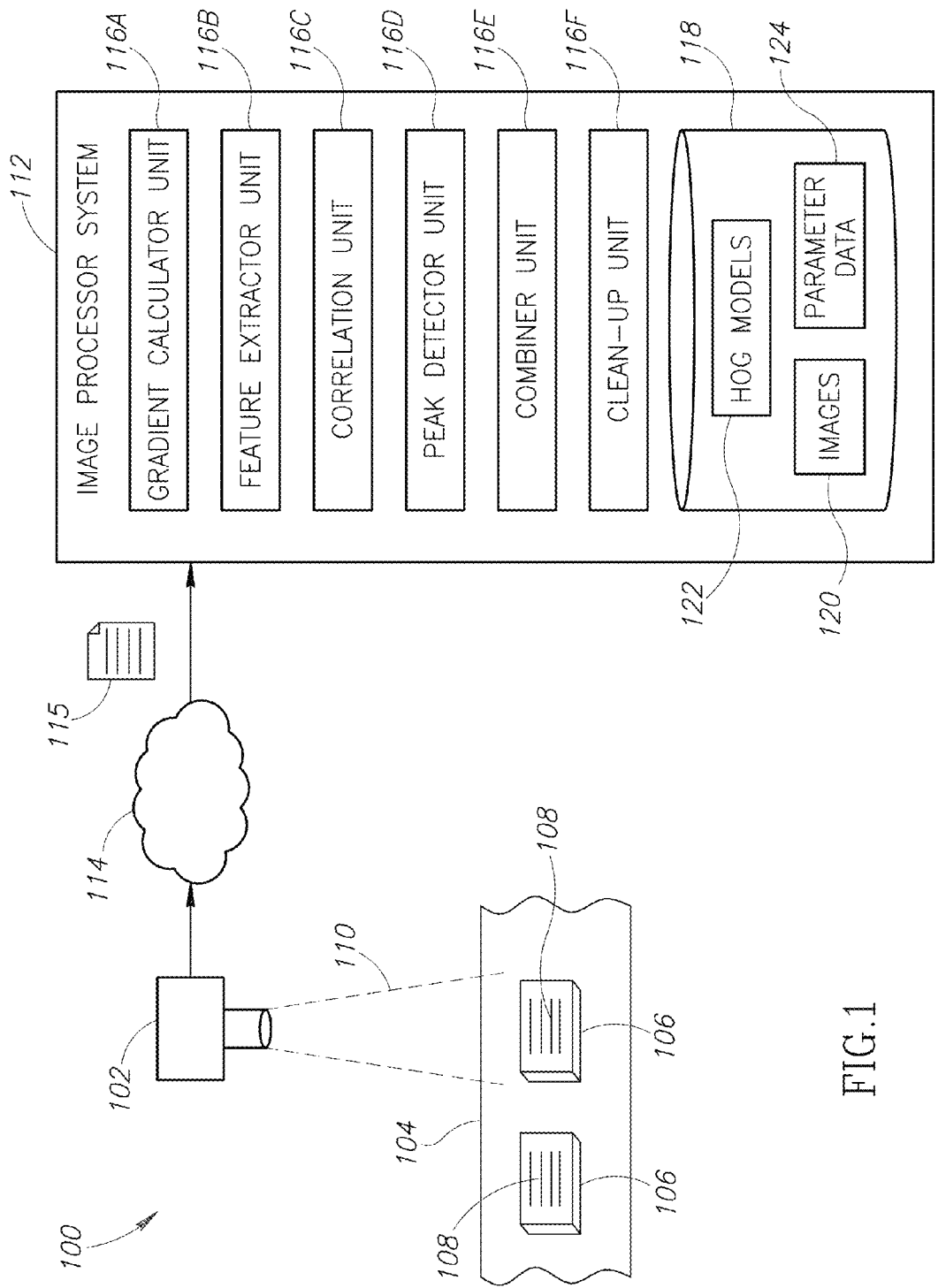
FIG. 1 is a schematic view of an industrial environment in which an optical character recognition system may operate, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with optical character recognition systems, server computers, and/or communications networks have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined or assembled in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

One or more implementations of the present disclosure provide robust optical character recognition (OCR) systems, methods, and articles for use in industrial environments that do not require a segmentation sub-process. As discussed further below, one or more implementations include utilizing Histogram of Oriented Gradients (HOG) features with a sliding window approach as a robust and computationally efficient method of OCR in industrial environments. The implementations discussed herein are relatively simple to use because there are relatively few parameters to adjust, which allows a non-expert user to setup or modify the system and achieve desirable performance. One reason this is possible is because the implementations described herein do not require character segmentation, which can be difficult to optimize.

A HOG feature is a feature wherein the object to be detected is represented as a set of orientation gradients computed on small patches covering an image of the object. The sliding window approach computes the HOG features throughout an entire image and then correlates the image with the HOG object model of the object to be detected. The correlation act may be viewed as sliding the HOG object model throughout the entire image. At each location of the image, the correlation result encodes how strongly the image matches the HOG object model at that location.

The correlation act may be followed by one or more filtering acts (e.g., local peak detection) to ensure that the system properly identifies the presence or absence of the object to be detected. To develop the OCR system, training images of the detection objects, such as characters, as well as non-detection objects that look like the detection objects, may be used to train the system. In the present disclosure, the detection objects may include a plurality of characters (e.g., letters, numbers, symbols, etc.). Labeled training images of characters may be used to build HOG character models for the characters, as well as to train a classifier that decides which HOG detections are actually characters.

FIG. 1 illustrates an implementation depicting an optical character recognition (OCR) system 100, according to at least one embodiment. As discussed further below, the OCR system 100 may be employed to automatically recognize one or more characters or symbols in an image of a target object. The OCR system 100 described herein may be used at any suitable time, such as during a verification sub-process in a manufacturing process.

In some embodiments, the OCR system 100 may include an image capture device 102, such as a camera or scanner. Appropriate interfaces or signals may be connected to and/or installed in the image capture device 102 so that the image capture device captures an image of a target object. In the illustrated embodiment, a conveyor 104 carries a plurality of target objects 106 having characters 108 printed or otherwise inscribed thereon during a manufacturing process. The target objects 106 may pass in turn within a field of view (FOV) 110 of the image capture device 102 during an inspection or verification process. As such, the image capture device 102 acquires at least one image of each of the target objects 106.

In some embodiments, the image capture device 102 may be operatively coupled to an image processor system 112 through a network 114 (e.g., LAN, WAN, Internet). The image processor system 112 receives digital images 115 from the image capture device 102. In some embodiments, the image capture device 102 may be connected directly to the image processor system 112 through a suitable connector (e.g., USB) or may be integrated with the image processor system.

The image processor system 112 includes a number of units 116 or modules that may be used to perform the functionality disclosed herein. Each of these units 116 may be implemented as separate or combined sub-processes or applications executing on the image processor system 112. In some implementations, fewer or more units 116 may be provided. In the illustrated embodiment, the image processor system 112 includes a gradient calculator unit 116A, a feature extractor unit 116B, a correlation unit 116C, a peak detector unit 116D, a combiner unit 116E, and a clean-up unit 116F. Each of these units 116 is discussed in detail below with reference to FIGS. 3-11. The image processor system 112 also includes a data store 118 which may store image data 120, histogram of oriented gradients (HOG) models 122, parameter data 124, or other data utilized in the OCR processes discussed below. The data store 118 may be integrated with the image processor system 112 or may be coupled to the image processor system via a suitable connection, such as a network.

The image processor system 112 may take the form of one or more server computer systems with associated nontransitory processor-readable storage media (e.g., the data store 118). While illustrated as a single computer system and associated nontransitory storage media, many implementations may employ two or more computer systems and/or nontransitory associated processor- or computer-readable storage media. In some implementations or instances, the nontransitory processor- or computer-readable media may include a database or other data structure which stores one or more of: image data, model data, training data, test data, parameter data, character detection or recognition algorithms, and/or other data.

While generally described below in terms of a user interface generated via instructions executing on a computing device, in some implementations the image processor system 112 may serve as a user portal that may operate, for example, as a Web server, serving HTML pages or providing Web services which function as the user interface. Thus, in some implementations, the image processor system 112 serves as a user portal, providing a user interface, for instance a Web based interface, which allows users access functionality disclosed herein via various other processor-based computing devices.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage medium or may be stored on the same computer- or processor-readable storage medium as one another. Various computer- or processor-readable storage medium may be co-located with the corresponding computer systems, for example, in the same room, building or facility. Alternatively, various computer- or processor-readable storage medium may be located remotely from the corresponding computer systems (e.g., server computer systems) for example, in a different facility, city, state or country. Electronic or digital information, files or records or other collections of information may be stored at specific locations in non-transitory computer- or processor-readable media, thus are logically addressable portions of such media, which may or may not be contiguous.

Figure 2:
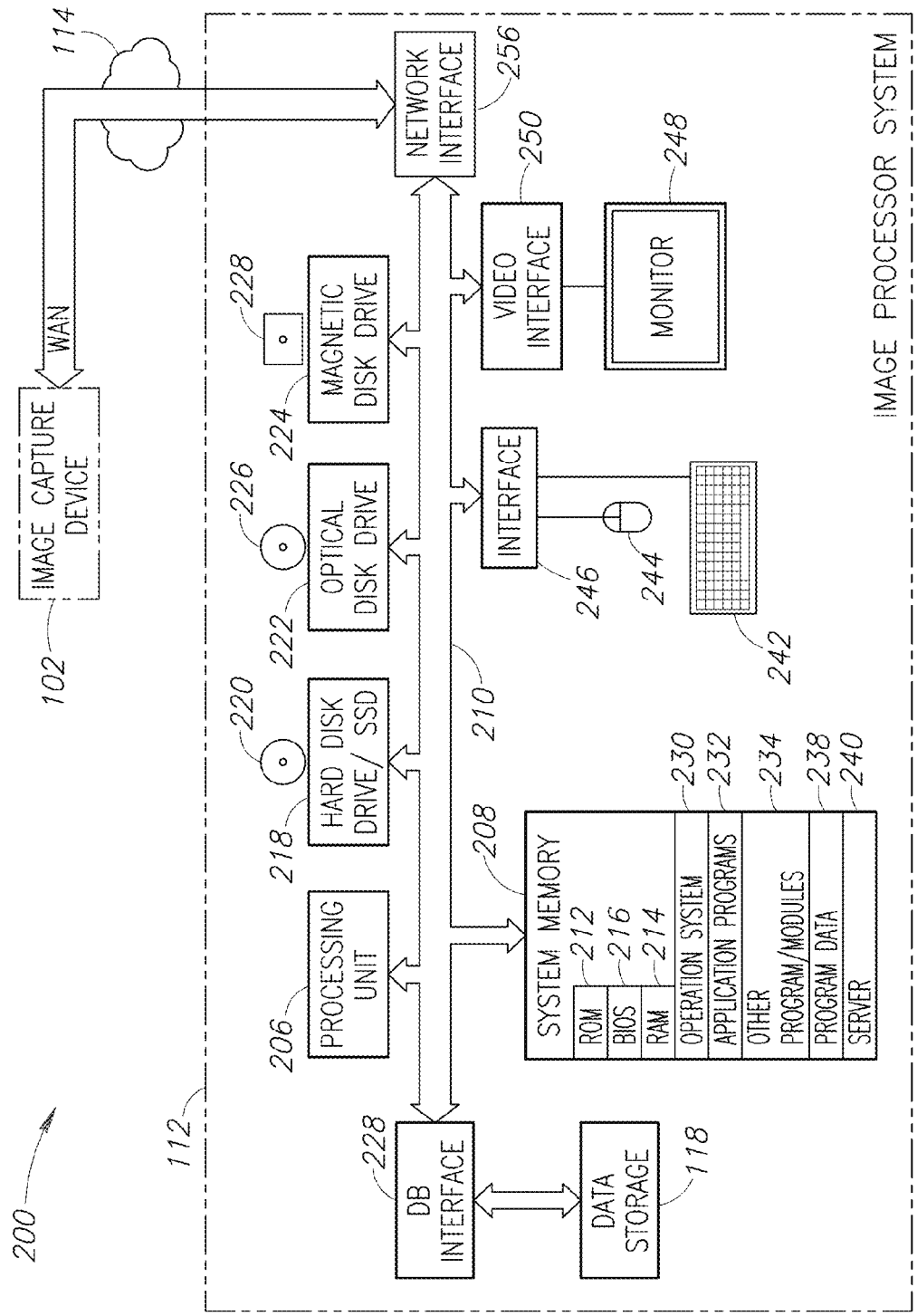
FIG. 2 is a functional block diagram of an image processor system, according to at least one illustrated embodiment.

FIG. 2 and the following discussion provide a brief, general description of the components forming the OCR system 100 including the image processor system 112 and the image capture device 102 in which the various illustrated embodiments can be implemented. The OCR system 100 may, for example, implement the various functions and operations discussed immediately above in reference to FIG. 1. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The image processor system 112 may take the form of a conventional PC, server, or other computing system executing logic or other machine executable instructions. The image processor system 112 includes one or more processors 206, a system memory 208 and a system bus 210 that couples various system components including the system memory 208 to the processor 206. The image processor system 112 will at times be referred to in the singular herein, but this is not intended to limit the embodiments to a single system, since in certain embodiments, there will be more than one image processor system 112 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the image processor system 112, such as during start-up. Some embodiments may employ separate buses for data, instructions and power.

The image processor system 112 also may include a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processor 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, respectively, provide nonvolatile storage of computer-readable instructions, data structures, program modules and other data for the image processor system 112. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, and program data 238.

The application program(s) 232 may include logic capable of providing the OCR functionality described herein. For example, applications programs 232 may receive digital images (FIG. 1) captured from the image capture device 102 or stored in a data store.

The system memory 208 may include communications programs 240 that permit the image processor system 112 to access and exchange data with other networked systems or components, such as the image capture device 102 and/or other computing devices.

While shown in FIG. 2 as being stored in the system memory 208, the operating system 230, application programs 232, other programs/modules 234, program data 238 and communications 240 can be stored on the hard disk 220 of the hard disk drive 218, the optical disk 226 of the optical disk drive 222 and/or the magnetic disk 228 of the magnetic disk drive 224.

Authorized personnel can enter commands (e.g., system maintenance, upgrades, etc.) and information (e.g., OCR parameters, equations, models, etc.) into the image processor system 112 using one or more communicably coupled input devices such as a touch screen or keyboard 242, a pointing device such as a mouse 244, and/or a push button (not shown). Other input devices can include a microphone, joystick, game pad, tablet, scanner, biometric scanning device, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. In at least some instances, the input devices may be located proximate the image processor system 112, for example when the system is installed at the system user's premises. In other instances, the input devices may be located remote from the image processor system 112, for example when the system is installed on the premises of a service provider.

In some implementations, the image processor system 112 uses one or more of the logical connections to optionally communicate with one or more remote computers, servers and/or other devices via one or more communications channels, for example, one or more networks 114. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 256, communicatively linked to the system bus 210, may be used for establishing and maintaining communications over the communications network 114. Further, a data store interface 252, which is communicatively linked to the system bus 210, may be used for establishing communications with the non-transitory processor-readable storage medium or data store 118, which may a part of the image processor system 112 or at least in operative communication therewith. For example, the data store 118 may include a repository for storing information regarding OCR parameters, models, image data, etc. In some embodiments, the database interface 252 may communicate with the data store 118 via the networks 114.

In the OCR system 100, program modules, application programs, or data, or portions thereof, can be stored in one or more computing systems. Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processor 206, system memory 208, network port 256 and interfaces 246, 252 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

Figure 3:
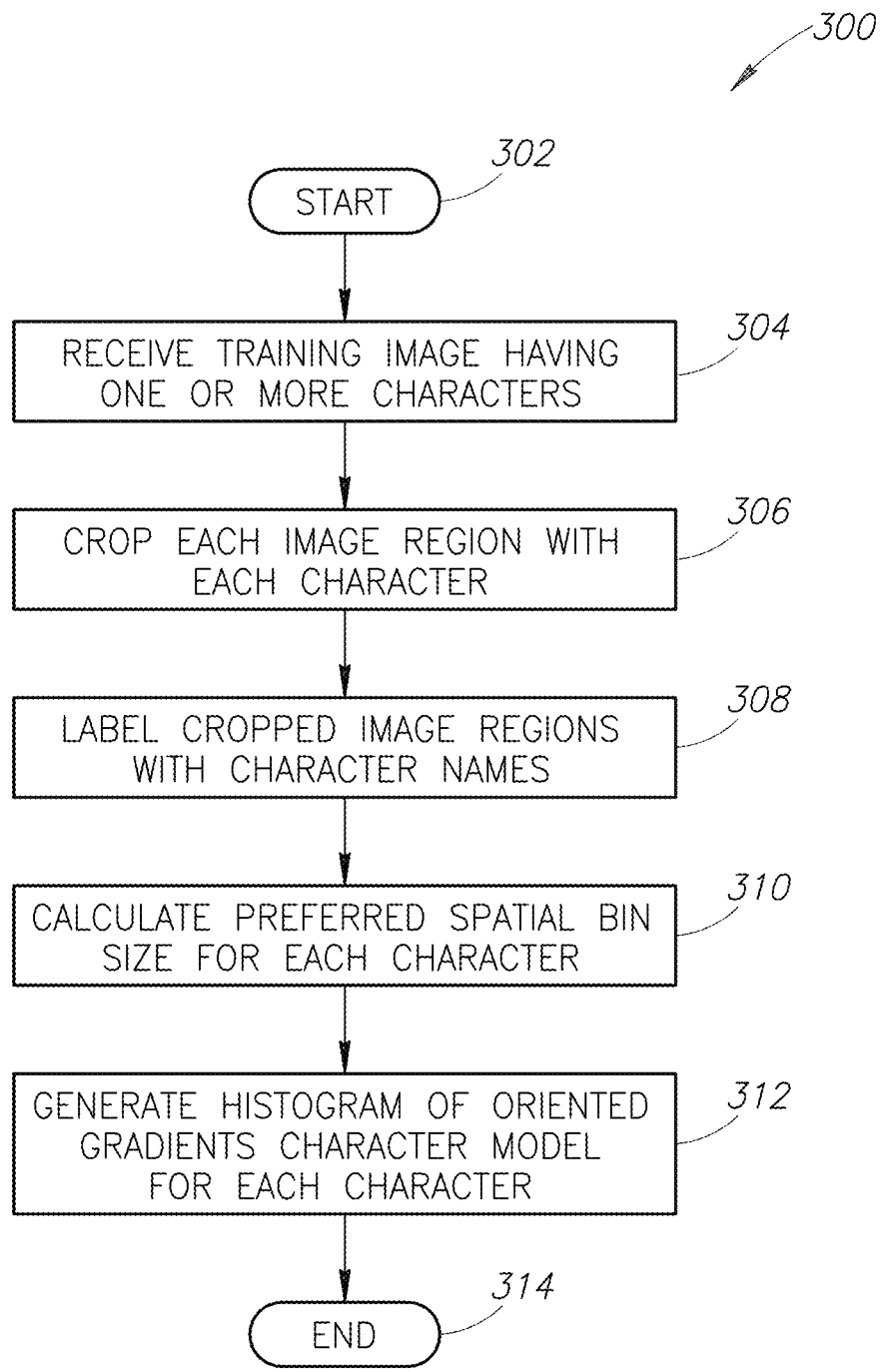
FIG. 3 is a flow diagram showing a method of operation of a processor-based device in an optical character recognition system to train characters, according to at least one illustrated embodiment.
Figure 4:
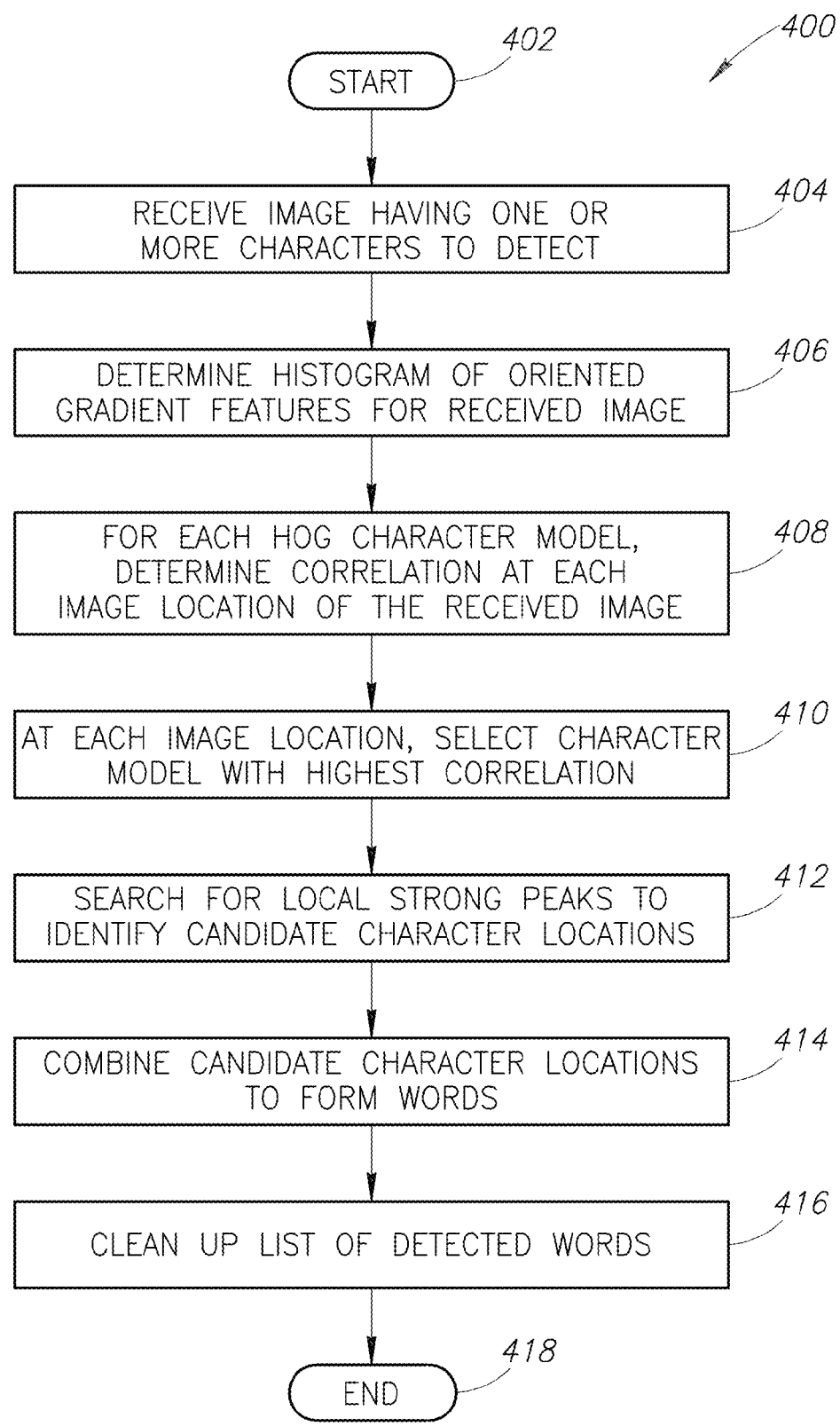
FIG. 4 is a flow diagram showing a method of operation of a processor-based device in an optical character recognition system to recognize characters, according to at least one illustrated embodiment.

FIG. 3 shows a method 300 of operating a processor-based device to train an OCR system, according to one illustrated embodiment. FIG. 4 shows a method 400 of operating a processor-based device to perform OCR on a digital image. Notably, the approach described herein provides OCR in industrial settings (e.g., verification of best before dates or lot numbers on food packages) with a high degree of accuracy and performance in non-ideal conditions (e.g., printed labels on curved surfaces, printed labels on textured background, etc.) without requiring a character segmentation sub-process.

The method 300 starts at 302. For example, the method 300 may start in response to an opening of a specific application or selection of an icon displayed on a display of a processor-based device, such as the image processor system 112 of FIG. 1.

At 304, the processor-based device may receive a one or more training images having examples of characters to be recognized. For example, the training images may include letters, numbers, or symbols that are similar to characters printed or otherwise inscribed or applied on food packaging. The training images may be received from an image capture device 102 or may be retrieved from a nontransitory processor-readable storage medium communicably coupled to the processor-based device.

At 306, the processor-based device may crop each image region having a character therein to generate a plurality of character images. At 308, the processor-based device may label each of the plurality of character images with the name of the character shown in the character image (e.g., "A", "B", "2", "$", etc.). This process may be implemented manually by a user or may be performed automatically (i.e., autonomously) by a tool that automatically detects characters and selects a crop size for each character image. In some implementations, each of the character images is cropped to be the same size, which may speed up one or more object recognition sub-process (e.g., a correlation act discussed below with reference to FIG. 4). The cropping, labeling, and size selection may be performed manually by a human user, autonomously, or any combination thereof.

At 310, the processor-based device may calculate a preferred spatial bin size for the characters. The spatial bin size is the size (e.g., in pixels) of each patch or cell into which a character model is divided. As discussed below, for each of the patches, an orientation histogram is computed. Choosing a suitable spatial bin size is advantageous because two small of a spatial bin size results in more computation, while too large of a spatial bin size causes the resulting OCR system to be less discriminative. In some implementations, if a character image is 40 pixels wide, the bin size is 6×6 pixels, 8×8 pixels, etc.

At 312, the processor-based device generates a HOG character model for each character by extracting HOG features from the each of the character images. The resulting HOG character models may be stored in a nontransitory processor-readable medium, such as the data store of FIG. 1. The processor-based device may also determine and store other parameters, such as the expected spacing between the characters.

In some implementations, the processor-based device generates a HOG character model for each character by computing an image gradient at each pixel, and accumulating the gradients over orientation and spatial regions ("cells"). See N. Dalal and B. Triggs, "Histograms of oriented gradients for human detection," Conference on Computer Vision and Pattern Recognition (CVPR), 2005, incorporated herein by reference. The processor-based device may compute a histogram of gradient orientation within each cell. The image may be divided into cells using a variety of schemes (e.g., log-polar cells, square cells). Square cells have been found to be effective and computationally efficient. As can be appreciated, binning orientation and spatial position introduces some invariance to local image deformation.

In some implementations, the processor-based device may group contiguous ranges of cells into "blocks." The descriptor for each block may also be independently normalized (e.g., L2 normalization) to have a constant norm. In some embodiments, the blocks may overlap by one or more cells such that each cell is represented multiple times in the final descriptor or feature vector formed by concatenating all of the blocks. In one example, training character images are 40 pixels wide, the blocks are 2×2 cells overlapping by one cell in each direction, and the cells are squares of width 6-8 pixels. The number of orientation bins may be any suitable value, such as nine orientation bins, signed or unsigned. The resulting HOG character models may be stored in a data store for use during an OCR process, discussed below with reference to FIG. 4.

The method 300 ends at 314 until started again. For example, the method 300 may begin again when one or more additional HOG character models are to be generated using new or different training images. For example, the method 300 may be implemented for a new manufacturing process, a new product, a new label, etc.

FIG. 4 shows the method 400 of operating a processor-based device to recognize words using an OCR system utilizing the generated HOG character models provided by the method 300 of FIG. 3. The method 400 may be performed by one or more units of the image processor system 112 of FIG. 1, for example. FIGS. 5-11 show various exemplary images during sequential acts of the OCR method 400. FIGS. 5-11 are discussed in the context of the method 400 to enhance understanding.

Figure 5:
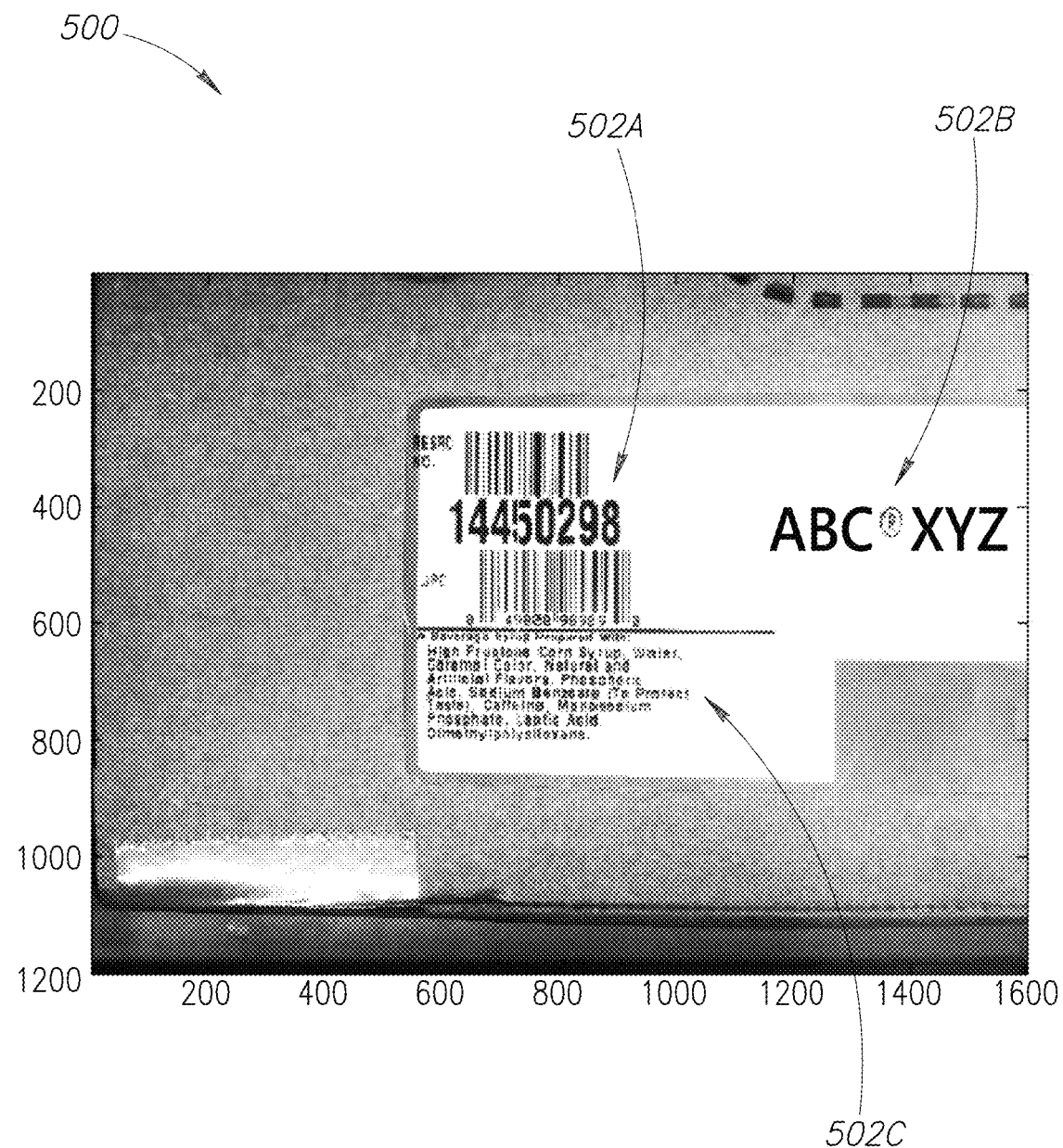
FIG. 5 is a screen print depicting an image having characters that may be recognized using the optical character recognition system of FIG. 1, according to at least one illustrated embodiment.

The method 400 starts at 402. For example, the method 400 may start in response to an image capture device, such as the image capture device 102 of FIG. 1, capturing a digital image of a target object (e.g., objects 106 of FIG. 1) that includes one or more characters printed on a surface thereof At 404, the processor-based device receives an image that includes one or more characters to be recognized. The processor-based device may receive the digital image directly from an image capture device or indirectly from a data store, such as a database of images. FIG. 5 depicts a 1200×1600 pixel image 500 having characters 502 that may be recognized using an image processor system, such as the image processor system 112 of FIG. 1. In the example illustrated in FIG. 5, characters 502A are characters to be detected. The image 500 also includes characters 502B and 502C that should not be detected by the OCR system.

At 406, the processor-based device computes HOG image features throughout the received image. This act may be performed by the gradient calculator unit 116A and the feature extractor unit 116B of the image processor system 112 of FIG. 1, for example. In some implementations, the spatial bin size used to compute the HOG image features for the image is the same size as the spatial bin sized used to generate the HOG character models during the training method 300 (FIG. 3). If the HOG character models and HOG image features computation utilize different spatial bin sizes, the image may need to be processed more than once, resulting in a relatively slower recognition process. However, in some implementations, using differently sized spatial bins may be advantageous because results that are more accurate may be obtained.

At 408, the processor-based device uses a sliding window approach to compute a correlation between each of the HOG character models and the HOG image features of the image at each location of the image. This act may be performed by the correlation unit 116C of the image processor system 112 of FIG. 1, for example. For each HOG character model, a correlation matrix is generated which includes a correlation value for the HOG character model at each location of the image. That is, for a number N of HOG character models, N correlation matrices are generated.

Figure 6:
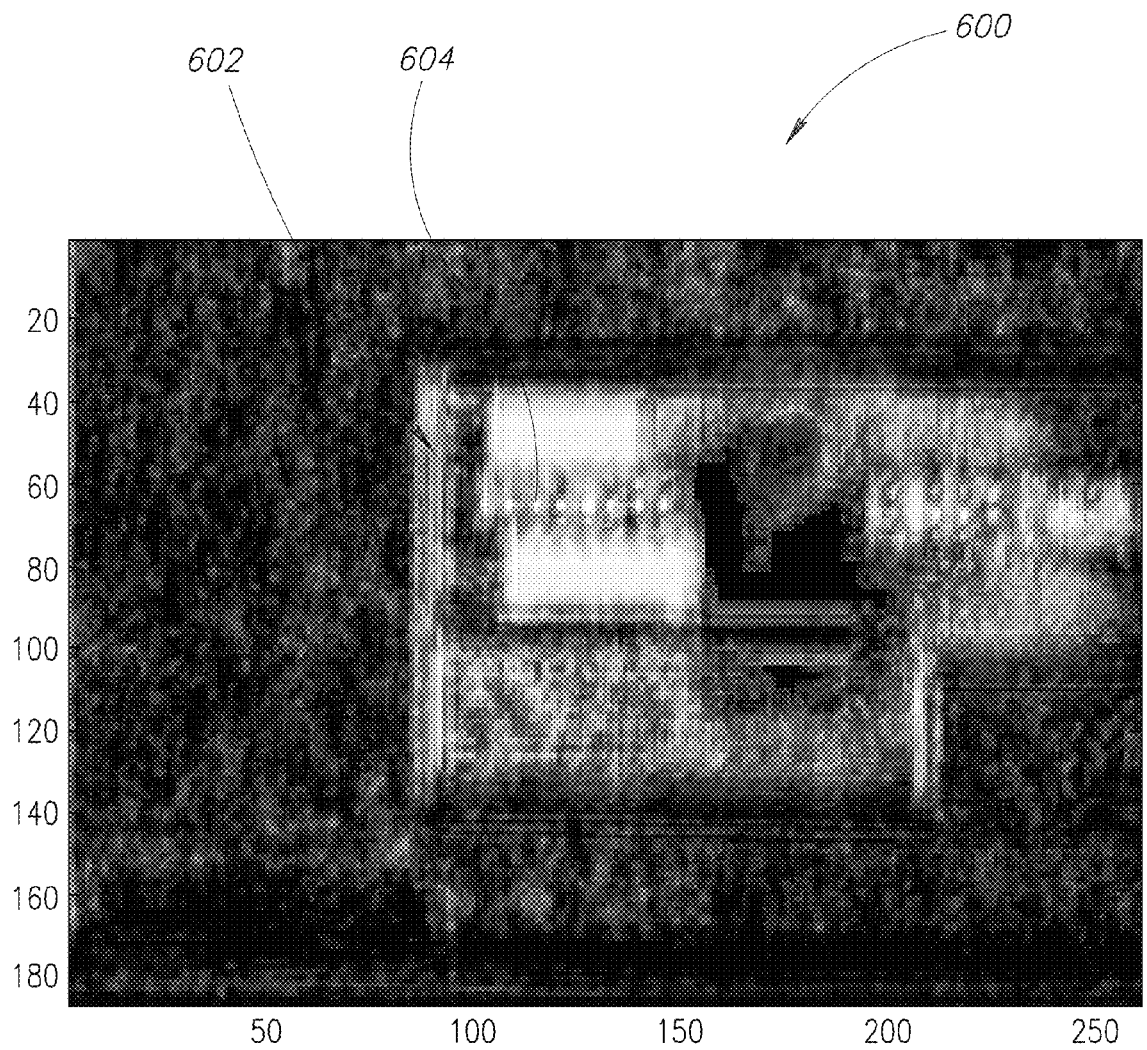
FIG. 6 is a screen print depicting an image showing a maximum correlation between the image of FIG. 5 and character models, according to at least one illustrated embodiment.

At 410, the processor-based device selects, for each location of the received image, the HOG character model having the highest correlation value. For example, the highest correlation value for an image location A may be from a first HOG character model X associated with a first known character, whereas the highest correlation value for an image location B may be from a second HOG character model Y associated with a second known character. This generates two new matrices: a max correlation value matrix and an index matrix. The max correlation value matrix logically associates each image location with its maximum correlation value (i.e., the correlation value of the HOG character model having the highest correlation value at the image location). The index matrix logically associates each image location with the HOG character model (or the known character) that corresponds to the maximum correlation value. FIG. 6 is an image 600 (or "maximum correlation map") depicting maximum correlation values between the HOG image features of the image 500 of FIG. 5 and the HOG character models. As can be seen, strong localized peaks 604 occur at image locations at which the characters to be detected reside.

Figure 7:
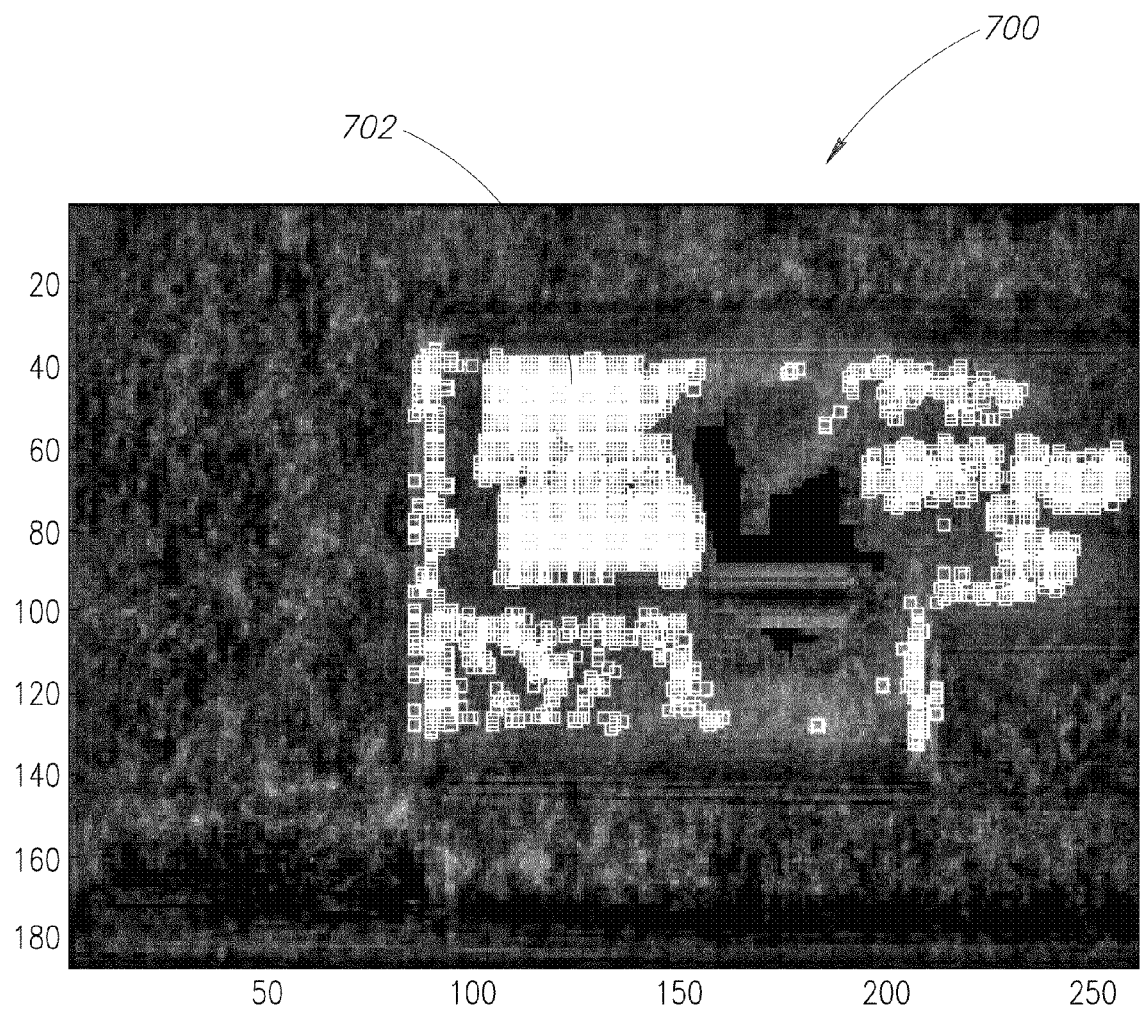
FIG. 7 is a screen print depicting an image showing a maximum correlation between the image of FIG. 5 and character models, where the maximum correlation values are above a minimum correlation value threshold, according to at least one illustrated embodiment.

At 412, the processor-based device searches the maximum correlation value matrix for local strong peaks to identify candidate character locations for recognized characters that may form words. This act may be performed by the peak detector unit 116D of the image processor system 112 of FIG. 1, for example. In some implementations, a threshold is first applied so that only image locations where the maximum correlation value is larger than a minimum correlation value threshold (e.g., 0.3, 0.4) are retained for further processing. The minimum threshold value may be chosen to be relatively low to ensure that no good candidate character locations are discarded, even at the expense of generating many spurious candidate character locations at this stage. FIG. 7 depicts an image 700 showing maximum correlation values 702 that are above the minimum correlation value threshold.

To further filter the candidate character locations, the processor-based device may determine whether each of the candidate character locations above the minimum correlation value threshold are a local maximum compared to their surrounding 1-pixel neighbors, and keep only those that are a local maximum for further processing. As used herein, a pixel B is an n-pixel neighbor of a center pixel (CP) to be examined if the minimum number of pixels that need to be traversed to get from pixel CP to pixel B is n, where pixels can be traversed horizontally, vertically, and along the diagonal (so an n-pixel neighbor is in this sense a distance of n pixels away from the center pixel CP). Put another way, the set of n-pixel neighbors of a pixel CP is a set of pixels residing on the outermost edge of a square of pixels having a side equal 2n+1, wherein the pixel CP is located in the center of the square of pixels. For illustration, FIG. 12 shows the eight 1-pixel neighbors (designated 1-P) surrounding a center pixel CP that is to be evaluated. FIG. 12 also shows the 16 2-pixel neighbors (designated 2-P) surrounding the 1-pixel neighbors. Although not illustrated, one skilled in the art will appreciate that the 3-pixel neighbors for the center pixel CP are the 24 pixels that form a square border or band surrounding the 2-pixel neighbors (2-P) of the center pixel CP.

Figure 8:
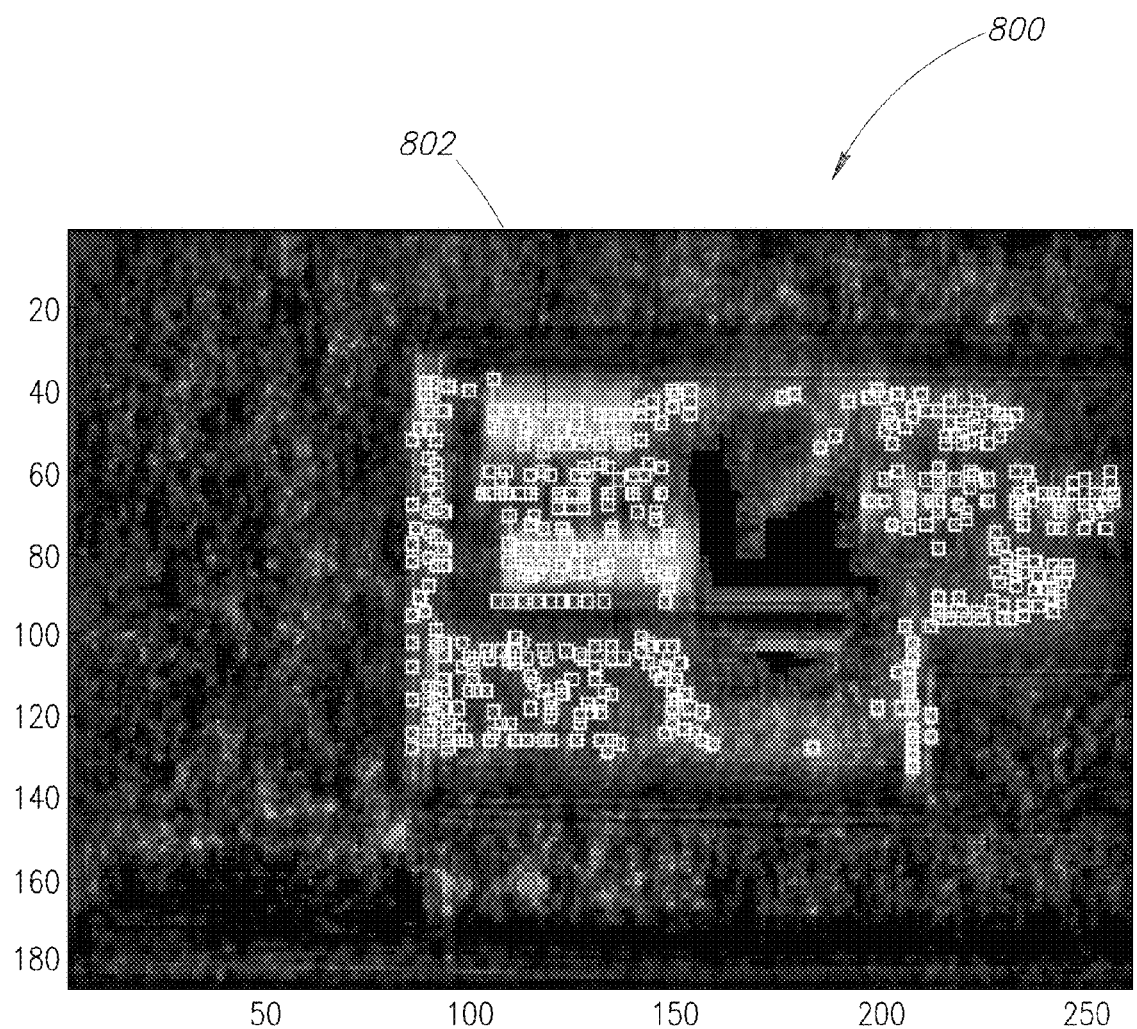
FIG. 8 is a screen print depicting an image showing local 1-pixel maxima for the image of FIG. 5, according to at least one illustrated embodiment.

As an example, in some implementations a pixel CP to be evaluated that is positioned at row M and column N (M,N) of the maximum correlation value matrix may need to have a maximum correlation value greater than the maximum correlation values at the 1-pixel neighbors located at locations (M−1,N−1), (M−1,N), (M−1,N+1), (M,N−1), (M,N+1), (M+1,N−1), (M+1,N), and (M+1,N+1) to be retained (see the 1-P pixels in FIG. 12). It is noted that to avoid missing a character because two adjacent locations have the same exact correlation value, and thus there is no center pixel with a correlation higher than all of the neighbors, the processor-based device may check that the top and left border is strictly less than the center, and that the right and lower border is less than or equal to the center, thus breaking the symmetry. FIG. 8 depicts an image 800 showing maximum correlation values 802 for the image that are local 1-pixel maxima.

Figure 9:
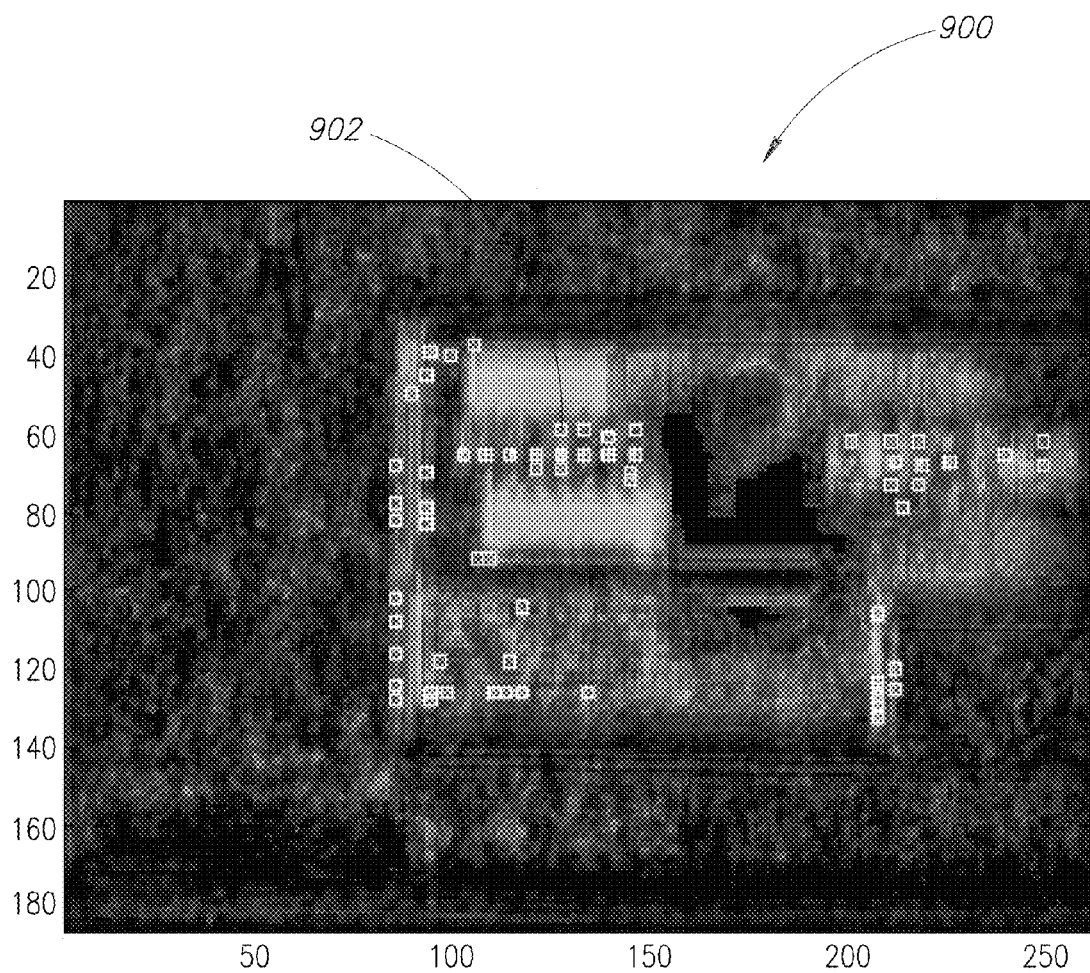
FIG. 9 is a screen print depicting an image showing local maxima for the image of FIG. 5 that have a correlation stronger than a median value of the correlation of 2-pixel neighbors, according to at least one illustrated embodiment.

In some implementations, the processor-based device may further filter the remaining candidate character locations. For instance, in some implementations the processor-based device may, for each remaining candidate character location, compare the maximum correlation value (which corresponds to a particular character and character model) at that center pixel with the correlation values for the same particular character at each of the 2-pixel neighbors of the center pixel. The processor-based device may keep only those image locations for which the median (or mean or max) value of the correlation values for the same particular character at the image location's 2-pixel neighbors (e.g., the 16 2-P pixels shown in FIG. 12) is small compared to the maximum correlation value of the examined image location. In some implementations, the examined image location (e.g., pixel CP in FIG. 12) is retained only if its maximum correlation value is much greater than (e.g., twice) the median (or mean or max) of the same character's correlation values of the examined image location's 2-pixel neighbors (e.g., pixels 2-P in FIG. 12), for example. FIG. 9 depicts an image 900 showing local maximum correlation values 902 that have a correlation stronger than a median value of the 2-pixel neighbors' correlation values for the character that produced the maximum correlation value at the center pixel.

In the above example, the calculation may be as follows:

If the i-th character model produced the maximum correlation value at the center pixel, compute a correlation ratio for the center pixel:

correlation ratio=maximum correlation value at center pixel/mean(correlation value for the i-th character model at 2-pixel neighbors); or correlation ratio=maximum correlation value at center pixel/maximum(correlation value for the i-th character model at 2-pixel neighbors); or correlation ratio=maximum correlation value at center pixel/median(correlation value for the i-th character model at 2-pixel neighbors).

The processor-based device may retain only those remaining candidate character locations having a correlation ratio equal to or greater than a threshold (e.g., 1.5, 2, 3, etc.). In this way, the processor-based device checks that the character that is thought to be a good candidate at the center pixel in fact has a strong peak right there at that location, and is not an entire ridge or area of similar high value correlations (which may happen with 0's or 1's, which can match strongly along an entire ridge (line) in an image). It is noted that the processor-based device advantageously uses the maximum correlation values for the initial step of finding local peaks (comparing to 1-pixel neighbors), and then uses the correlation values of the best character model to find the "strong" local peaks (comparing to 2-pixel neighbors).

In some implementations, when finding the "strong" local peaks, rather than using the correlation values of the same character that produced the maximum correlation value at the center pixel, the processor-based device may compare the maximum correlation value at the center pixel with the median (or mean or max) of the maximum correlation values of the 2-pixel neighbors of the center pixel.

It should be appreciated that other types of spatial filters or detectors may be utilized to identify candidate character locations.

After performing the aforementioned filtering acts, the result is a short list of all the candidate character locations in the received image, along with a few spurious false positive max correlation values.

At 414, the processor-based device combines or assembles the remaining candidate character locations to form words. This act may be performed by the combiner unit 116E of the image processor system 112 of FIG. 1, for example. The processor-based device may utilize various algorithms to combine or assemble the remaining candidate character locations into words. Some algorithms could include probabilistic approaches, energy minimization functions, or cost minimization functions, for example.

In some implementations, the processor-based device combines or assembles candidate character locations into words by finding groups of candidate character locations that have proper character spacing between them and the correct orientation. As discussed above, the proper character spacing and orientation may be learned during training and stored in a nontransitory processor-readable storage medium (e.g., the data store of FIG. 1).

In some implementations, the processor-based device may select a candidate character location from the remaining set of candidate character locations. The processor-based device may search to the left and right of the candidate character location to find another candidate character location at the proper expected spacing. The proper expected spacing may be a range of spacing (e.g., a range of 1 or 2 pixels).

Figure 10:
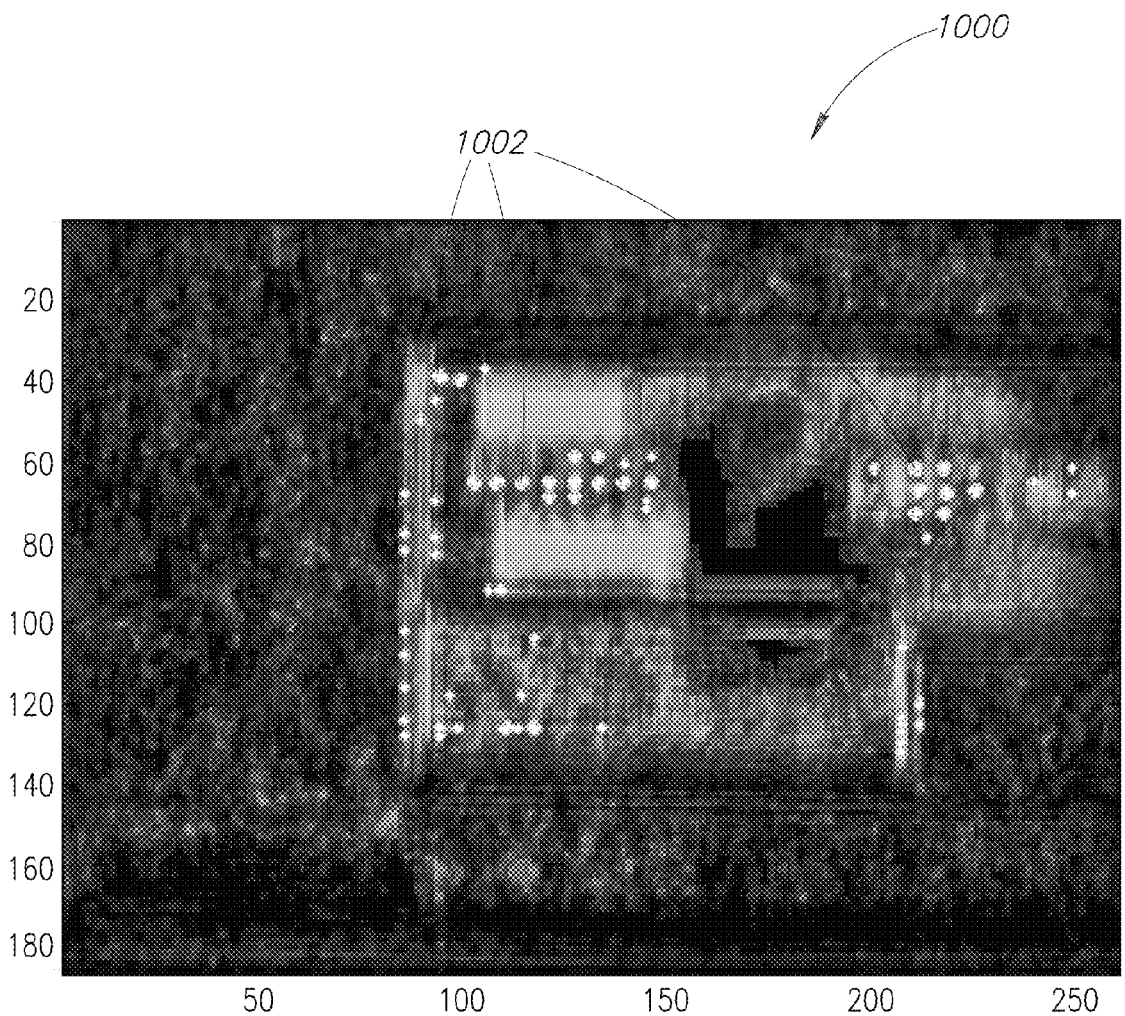
FIG. 10 is a screen print depicting an image showing detected words for the image of FIG. 5 based on acceptable character spacing, according to at least one illustrated embodiment.

If a candidate character location with the proper spacing is identified, the processor-based device may continue searching to the left and right for additional characters at the proper expected spacing until no additional correctly spaced characters are found. Then, the set of characters found with the correct spacing are combined to form a word and are removed from the list of candidate character locations. The processor-based device may then select another candidate character from the remaining list and repeat the process until all of the candidate characters have been evaluated. FIG. 10 depicts an image 1000 showing detected words 1002 for the image of FIG. 5.

Figure 11:
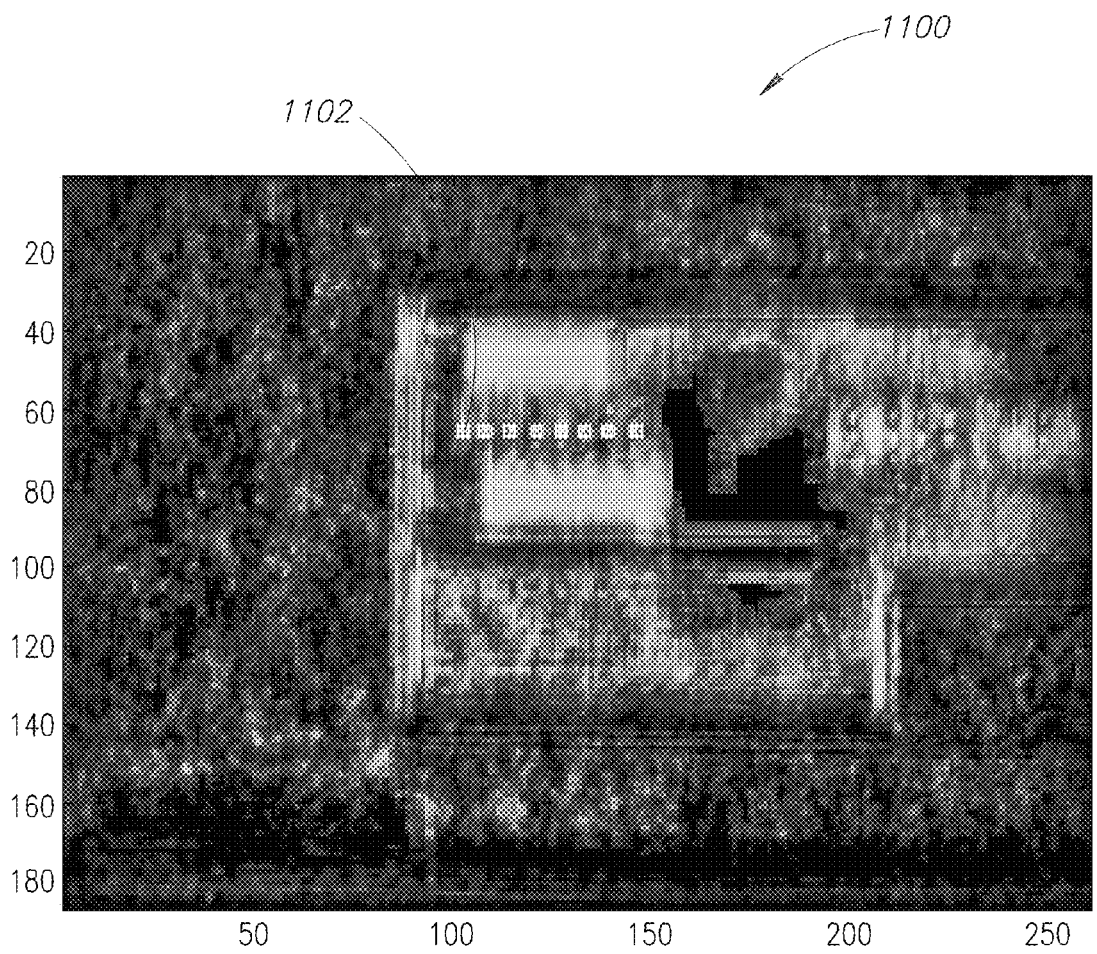
FIG. 11 is a screen print depicting an image showing detected words for the image of FIG. 5 wherein the mean character correlation is above a threshold, according to at least one illustrated embodiment.

At 416, the processor-based device may clean up the list of detected words to correct errors that may be present. This act may be performed by the clean-up unit 116F of the image processor system 112 of FIG. 1, for example. FIG. 11 depicts an image 1100 showing the remaining maximum correlation values 1102 for the correctly detected word for the image of FIG. 5. The remaining eight candidate character locations 1102 shown in FIG. 11 correspond to the characters "14450298" to be recognized in the image of FIG. 5.

Some detected words may be spurious, single characters, two characters with non-ideal spacing, or otherwise weak overall character correlations. In some implementations, the minimum length or exact length of words may be known before the OCR process is executed. For example, a product may be labeled with a lot number that has exactly 10 characters or a lot number that has at least 12 characters. In these cases, the processor-based device may apply a threshold to reject detected words that are shorter than the threshold (e.g., shorter than five characters). In some implementations, the processor-based device may also apply a threshold if the mean or median character correlation values are too low.

Occasionally, a longer word may be incorrectly detected as two or three shorter words. This may be because one single character in the longer word was not detected correctly. In some implementations, the processor-based device may perform a word merging process to recover from such failures. For example, if two detected words are spaced apart from each other such that a single character (or two characters) fits between the two words, with the proper spacing between the missing character(s) and the two words, the processor-based device may attempt to detect the missing character. In some embodiments, the processor-based device may attempt to detect the missing character(s) using a lower threshold than used during the first pass since the spacing of the two shorter words indicates that it is likely that a character is present in between the two shorter words. Further, in applications where the length of the words to be detected is known (e.g., a lot number code, an expiration date), that information may be used as an additional test or hint about whether or not to merge two words together.

The method 400 ends at 418 until started again. For example, the method 400 may begin again when an additional image having characters to be detected is received by the processor-based device.

As discussed above, in some implementations the processor-based device may determine whether each of the candidate character locations above the minimum correlation value threshold are a local maximum compared to their surrounding 1-pixel neighbors, and keep only those that are a local maximum for further processing. In these implementations, there can be at most one candidate character at each location, specifically, one candidate character at each 3×3 pixel region. Often, the one character with the strongest correlation value is the correct character, but in some instances two or more comparably strong correlations may be present, and a character other than the character with the maximum correlation value may actually be the correct character. Thus, in some implementations, the processor-based device may search for local peaks (e.g., compare with 1-pixel neighbors) using each character model's correlation matrix, instead of just using the maximum correlation matrix. The processor-based device may then search for strong local peaks (e.g., compare with 2-pixel neighbors) for each local peak (for multiple character models if applicable).

As can be appreciated, this implementation sometimes results in having more than one candidate character at the same image location. Thus, the processor-based device may select the correct character in subsequent acts, such as the acts discussed above used to form words out of candidate characters.

In some applications, the task is not OCR, but is optical character verification (OCV). In these applications, the task may be to verify that a specific, known character marking is printed on a target object. For these tasks, additional hints are available to make detection of the text more robust since not only the length of the words is known, but the specific sequence of characters may also be known. In these instances, computation may be sped up by not performing correlations for all candidate character locations, but only for some of the candidate character locations, and possibly only at image locations where characters are expected to be found (e.g., based on previously identified candidate character locations). For example, the processor-based device may know that the word "ABC" is the word to be detected. If the processor-based device determines an image location includes a character "A", the processor-based device may simply determine whether the character B is spaced to the right of the detected character "A" to determine if the first two letters ("AB") of the word "ABC" are present. The processor-based device may then determine whether the character C is spaced to the right of the detected character "B" to determine if the word "ABC" is present in the image.

In some applications, the processor-based device may output a quality measure of the detected words. For example, a quality measure may be the minimum correlation value of all the properly detected characters in the words. The quality measure may be a numerical value, a percentage, a grade, or other quantitative or qualitative measure. The quality measure may be used by the processor-based devise or by users as feedback to further improve the OCR process, the printing process, product packaging, etc., or to accept or reject objects having printed characters thereon.

Other techniques may be used to improve the speed or robustness of the OCR process. For example, in some implementations, the processor-based device may perform a preliminary classification to ignore portions of an image where characters are known not to exist. This has the advantage of eliminating the need to compute HOG image features and HOG correlation values on the ignored portions of the image. For example, portions of the image having uniform color may be ignored. As can be appreciated, if half of an image can be ignored, computation time speeds up by a factor of two.

In some implementations, additional training data may be utilized to improve the robustness of the OCR system. For example, the OCR system may be allowed to train or adapt for a period after installation referred to as a commissioning period. This may be done in various ways. For example, given the initial training of the OCR system, while running online the OCR system may collect all images where the classification failed. After a period (e.g., two weeks) of data collection, the additional data may be used to improve the OCR system. This improvement may be performed manually, with a user selecting a new, better subset of images to use to create training characters. Additionally or alternatively, this improvement may be performed automatically, where the OCR system evaluates which subset of training characters would provide optimal performance for the OCR process.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in an image processor system for recognizing one or more characters in an image of a target object, the method comprising:
   receiving, by a processor, image data representing an image of the target object;
   generating histogram of oriented gradients (HOG) features for the received image data;
   accessing, by the processor, a plurality of HOG character models stored in a nontransitory processor-readable storage medium, each of the plurality of HOG character models associated with a respective known character;
   for each of a plurality of image locations of the image, comparing each of the plurality of HOG character models to the generated HOG features of the image at the image location;
   determining a quality measure based at least in part on the comparing of each of the plurality of HOG character models to the generated HOG features of the image; and
   logically associating in a nontransitory processor-readable storage medium at least one known character with at least one image location based on the comparison to generate at least one candidate character location.

2. The method of claim 1, further comprising:
   combining two or more candidate character locations to form at least one word including two or more of the known characters; and
   storing the at least one word in a nontransitory processor-readable storage medium.

3. The method of claim 2 wherein combining two or more candidate character locations to form at least one word including two or more of the known characters comprises evaluating two or more candidate character locations for at least one of character spacing or character orientation.

4. The method of claim 2, further comprising:
   evaluating a spatial distance between two candidate character locations; and
   determining that the at least one word represents at least two words based at least in part on evaluating the spatial distance.

5. The method of claim 2, further comprising:
   forming at least two words each including two or more of the known characters;
   evaluating a spatial distance between the at least two words;
   determining that the at least two words represent a single word based at least in part on evaluating the spatial distance; and
   combining the two words to form the single word.

6. The method of claim 5, further comprising:
detecting at least one character spaced between two of the at least two formed words.

7. The method of claim 1, further comprising:
dividing the image data into a first portion in which characters are found and a second portion in which no characters are found, wherein generating histogram of oriented gradients (HOG) features for the received image data comprises generating histogram of oriented gradients (HOG) features for only the first portion of the received image data.

8. The method of claim 1, further comprising:
determining that at least one portion of the image data is of uniform color, wherein generating histogram of oriented gradients (HOG) features for the received image data comprises discarding the at least one portion determined to be of uniform color.

9. The method of claim 1 wherein logically associating in a nontransitory processor-readable storage medium at least one known character with at least one image location based on the comparison to generate at least one candidate character location comprises logically associating in a nontransitory processor-readable storage medium two or more known characters with one image location based on the comparison to generate at least one candidate character location associated with the two or more known characters.

10. A method of operation in an image processor system for recognizing one or more characters in an image of a target object, the method comprising:
receiving, by a processor, image data representing an image of the target object;
generating histogram of oriented gradients (HOG) features for the received image data;
accessing, by the processor, a plurality of HOG character models stored in a nontransitory processor-readable storage medium, each of the plurality of HOG character models associated with a respective known character;
for each of a plurality of image locations of the image, comparing each of the plurality of HOG character models to the generated HOG features of the image at the image location; and
logically associating in a nontransitory processor-readable storage medium at least one known character with at least one image location based on the comparison to generate at least one candidate character location,
wherein each of the plurality of HOG character models comprises a plurality of bins each having a spatial dimension, and generating histogram of oriented gradients (HOG) features for the received image data comprises dividing the received image data into a plurality of bins each having a spatial dimension that is equal to the spatial dimension of the bins associated with the HOG character models.

11. The method of claim 10 wherein dividing the received image data into a plurality of bins comprises dividing the received image data into a plurality of bins each having a width of six pixels, seven pixels, or eight pixels, and a height of six pixels, seven pixels, or eight pixels.

12. A method of operation in an image processor system for recognizing one or more characters in an image of a target object, the method comprising:
receiving, by a processor, image data representing an image of the target object;
generating histogram of oriented gradients (HOG) features for the received image data;
accessing, by the processor, a plurality of HOG character models stored in a nontransitory processor-readable storage medium, each of the plurality of HOG character models associated with a respective known character;
for each of a plurality of image locations of the image, comparing each of the plurality of HOG character models to the generated HOG features of the image at the image location, wherein comparing each of the plurality of HOG character models to the generated HOG features of the image at the image location comprises, for each of a plurality of image locations of the image, correlating each of the plurality of HOG character models with the HOG features at the image location to generate a correlation value for each of the HOG character models; and
logically associating in a nontransitory processor-readable storage medium at least one known character with at least one image location based on the comparison to generate at least one candidate character location;
for each of the plurality of image locations,
selecting one of the plurality of HOG character models having the highest correlation value with the image location;
logically associating the highest correlation value of the selected HOG character model with the image location in a nontransitory processor-readable storage medium; and
logically associating the known character associated with the selected HOG character model with the image location in a nontransitory processor-readable storage medium.

13. The method of claim 12, further comprising:
for each of the plurality of image locations,
comparing the highest correlation value of the selected HOG character model at the image location to the highest correlation value for at least one neighboring image location.

14. The method of claim 12, further comprising:
for each of the plurality of image locations,
comparing the highest correlation value of the selected HOG character model at the image location to the highest correlation value for each image location that is a 1-pixel neighbor of the image location.

15. The method of claim 14, further comprising:
for each of the plurality of image locations,
selecting the image location as a candidate character location if the highest correlation value of the selected HOG character model at the image location is equal to or greater than the highest correlation value for each image location that is a 1-pixel neighbor of the image location.

16. The method of claim 15, further comprising:
for each of the image locations selected as a candidate character location,
comparing the highest correlation value of the selected HOG character model at the image location to at least one correlation value for each image location that is a 2-pixel neighbor of the image location.

17. The method of claim 15, further comprising:
for each of the image locations selected as a candidate character location,
comparing the highest correlation value of the selected HOG character model at the image location with at least one of: a mean of the correlation values of the selected HOG character model at the image locations that are 2-pixel neighbors of the image location, a median of the correlation values of the selected HOG character model at the image locations that are 2-pixel neighbors of the image location, or a maximum of the correlation values of the selected HOG character model at the image locations that are 2-pixel neighbors of the image location.

18. The method of claim 17, further comprising:
for each of the image locations selected as a candidate character location,
retaining the image location as a candidate character location if the highest correlation value of the selected HOG character model at the image location is greater than or equal to twice at least one of: the mean of the correlation values of the selected HOG character model at the image locations that are 2-pixel neighbors of the image location, the median of the correlation values of the selected HOG character model at the image locations that are 2-pixel neighbors of the image location, or the maximum of the correlation values of the selected HOG character model at the image locations that are 2-pixel neighbors of the image location.

19. An image processor system, comprising:
at least one processor; and
at least one nontransitory processor-readable medium, communicatively coupled to the at least one processor and which stores histogram of oriented gradient (HOG) character models of a set of known characters and at least one of processor-executable instructions or data, each of the plurality of HOG character models comprises a plurality of bins each having a spatial dimension, wherein in use the at least one processor:
receives image data that represents an image of a target object;
divides the received image data into a plurality of bins each having a spatial dimension that is equal to the spatial dimension of the bins associated with the HOG character models:
generates histogram of oriented gradients (HOG) features for the received image data;
accesses the plurality of HOG character models stored in the at least one nontransitory processor-readable storage medium, each of the plurality of HOG character models associated with a respective known character;
for each of a plurality of image locations of the image, compares each of the plurality of HOG character models to the generated HOG features of the image at the image location; and
logically associates in the at least one nontransitory processor-readable storage medium at least one known character with at least one image location based on the comparison to generate at least one candidate character location.

20. The image processor system of claim 19 wherein the at least one processor:
divides the received image data into a plurality of bins each having a width of six pixels, seven pixels, or eight pixels, and a height of six pixels, seven pixels, or eight pixels.

21. The image processor system of claim 19 wherein, for each of a plurality of image locations of the image, the at least one processor:
correlates each of the plurality of HOG character models with the HOG features at the image location to generate a correlation value for each of the HOG character models.

22. The image processor system of claim 21 wherein, for each of a plurality of image locations of the image, the at least one processor:
selects one of the plurality of HOG character models having the highest correlation value with the image location;
logically associates the highest correlation value of the selected HOG character model with the image location in a nontransitory processor-readable storage medium; and
logically associates the known character associated with the selected HOG character model with the image location in a nontransitory processor-readable storage medium.

23. The image processor system of claim 22 wherein, for each of a plurality of image locations of the image, the at least one processor:
compares the highest correlation value of the selected HOG character model at the image location to at least one correlation value for at least one neighboring image location.

24. The image processor system of claim 22 wherein the at least one processor:
compares the highest correlation value of the selected HOG character model at the image location to at least one correlation value for each image location that is a 1-pixel neighbor of the image location; and
selects the image location as a candidate character location if the highest correlation value of the selected HOG character model at the image location is equal to or greater than the at least one correlation value for each image location that is a 1-pixel neighbor of the image location.

25. The image processor system of claim 24 wherein the at least one processor:
compares the highest correlation value of the selected HOG character model at the image location to at least one correlation value for each image location that is a 2-pixel neighbor of the image location.

26. The image processor system of claim 19 wherein the at least one processor:
combines two or more candidate character locations to form at least one word that includes two or more of the known characters; and
stores the at least one word in the at least one nontransitory processor-readable storage medium.

27. The image processor system of claim 26 wherein the at least one processor:
evaluates two or more candidate character locations for at least one of character spacing or character orientation.

28. The image processor system of claim 26 wherein the at least one processor:
evaluates a spatial distance between two candidate character locations; and
determines the at least one word represents at least two words based at least in part on evaluation of the spatial distance.

29. The image processor system of claim 26 wherein the at least one processor:
forms at least two words each including two or more of the known characters;
evaluates a spatial distance between the at least two words;
determine the at least two words represent a single word based at least in part on evaluation of the spatial distance; and
combines the two words to form the single word.

30. The image processor system of claim 29 wherein the at least one processor:
detects at least one character spaced between two of the at least two formed words.

31. The image processor system of claim 19 wherein the at least one processor:

determines a quality measure based at least in part on the comparison of each of the plurality of HOG character models to the generated HOG features of the image.

32. The image processor system of claim 19 wherein the at least one processor:
divides the image data into a first portion in which characters are found and a second portion in which no characters are found; and
generates histogram of oriented gradients (HOG) features for only the first portion of the received image data.

33. The image processor system of claim 19 wherein the at least one processor:
determines that at least one portion of the image data is of uniform color; and
generates histogram of oriented gradients (HOG) features for the received image data, wherein the at least one processor discards the at least one portion determined to be of uniform color.

34. A method of operation in an image processor system for recognizing one or more words in an image of a target object, the method comprising:
receiving, by at least one processor, training image data representing a plurality of training characters;
generating a plurality of histogram of oriented gradients (HOG) character models, each of the plurality of HOG character models associated with one of the training characters;
receiving, by at least one processor, image data representing an image of the target object;
generating HOG features for the received image data;
determining correlations between each of the HOG character models and the HOG features for the received image data;
determining a plurality of candidate character locations based on the determined correlations; and
assembling at least one word using at least some of the determined plurality of candidate character locations.

35. The method of claim 34 wherein determining a plurality of candidate character locations based on the determined correlations comprises:
for each image location of a plurality of image locations,
determining a maximum correlation value at the image location, the maximum correlation value being a correlation value of one or more of the plurality of HOG character models having the highest correlation value with the HOG features at the image location;
determining whether the image location is a local peak by determining whether the maximum correlation value at the image location is greater than or equal to maximum correlation values at image locations that are 1-pixel neighbors of the image location;
selecting the image location as a prospective candidate character location upon determining that the image location is a local peak;
for each image location selected as a prospective candidate character location,
determining whether the image location is a strong local peak by comparing the maximum correlation value at the image location with correlation values between the HOG character model and the HOG features at image locations that are 2-pixel neighbors of the image location; and
selecting the image location as a candidate character location upon determining that the image location is a strong local peak.

36. The method of claim 35 wherein determining whether the image location is a strong local peak by comparing the maximum correlation value at the image location with correlation values between the HOG character model and the HOG features at image locations that are 2-pixel neighbors of the image location comprises:
comparing the maximum correlation value at the image location with at least one of:
a mean of the correlation values between the HOG character model and the HOG features at image locations that are 2-pixel neighbors of the image location;
a median of the correlation values between the HOG character model and the HOG features at image locations that are 2-pixel neighbors of the image location; or
a maximum of the correlation values between the HOG character model and the HOG features at image locations that are 2-pixel neighbors of the image location.

37. The method of claim 34 wherein determining a plurality of candidate character locations based on the determined correlations comprises:
for each image location of a plurality of image locations,
for each HOG character model of the generated plurality of HOG character models,
determining whether the image location is a local peak by determining whether the correlation value between the HOG character model and the HOG features at the image location is greater than or equal to the correlation values between the HOG character model and the HOG features at image locations that are 1-pixel neighbors of the image location;
selecting the image location as a prospective candidate character location upon determining that the image location is a local peak;
for each image location selected as a prospective candidate character location,
determining whether the image location is a strong local peak by comparing the correlation value between the HOG character model and the HOG features at the at the image location with correlation values between the HOG character model and the HOG features at image locations that are 2-pixel neighbors of the image location; and
selecting the image location as a candidate character location upon determining that the image location is a strong local peak.

38. The method of claim 34 wherein determining a plurality of candidate character locations based on the determined correlations comprises:
for each image location of a plurality of image locations,
for each HOG character model of the generated HOG character models,
determining whether the image location is a strong local peak by comparing the correlation value between the HOG character model and the HOG features at the at the image location with correlation values between the HOG character model and the HOG features at image locations that are 2-pixel neighbors of the image location; and
selecting the image location as a candidate character location upon determining that the image location is a strong local peak.

* * * * *